2,878,155
SLIMICIDES

George A. Cruickshank, La Grange, Ill., assignor to National Aluminate Corporation, Chicago, Ill., a corporation of Delaware No Drawing. Application November 13, 1956
Serial No. 621,502

10 Claims. (Cl. 167—22)

This invention relates to slimicides and more particularly to compositions adapted to be used as dilute solutions in water to kill and control growth of slime-forming microorganisms.

The generally accepted theory of slime formation is that slime is composed of masses of bacteria, fungi, and/or algae, as single species, mixed species, or any mixture of the three classes of microorganisms. The slime may exist as a purely biological mass, or the microorganisms may serve as bonding agents to bind together various solid materials such as clay, vegetable fibers, chemical precipitates, dust, dirt, etc. The latter are the bulk of slime masses in many instances.

In many systems wherein water is utilized, objectionable slime is accumulated. Water cooling towers are examples of apparatus in which slime growth is a problem. One of the major problems in controlling slime formation is to find a composition which is toxic to the slime-forming microorganisms, which compositions will not separate from dilute aqueous solutions thereof when the solutions are allowed to stand for several hours. Another problem which is not easily solved is the formulation of a composition which has slimicidal properties and at the same time is substantially noncorrosive to steel drum containers.

It is an object of this invention to provide a slimicidal formulation which is noncorrosive to mild carbon steel such as is used in shipping drums.

Another object is to provide slimicidal compositions which are stable at high and low temperatures.

Another object is to provide slimicidal compositions which are stable in hard water.

A further object is to provide compositions for controlling slime growth in water cooling towers. Other objects will appear hereinafter.

In accordance with the invention a complex is formed between an aliphatic-substituted trimethylene diamine and a cupric salt of a lower molecular weight saturated monofunctional, fatty acid such as cupric acetate or cupric propionate. A small amount of propionic acid or benzoic acid is included in the formulation to minimize corrosion of the steel drums. Other ingredients of the formulation besides water are isopropanol and a nonionic wetting-dispersing agent.

The ratio of the copper salts to the fatty diamine is a critical factor in keeping the formulation stable at low temperatures. The molar ratio of the copper salts to the fatty diamine should not exceed 1:3, respectively. The preferred ratio is about 1:4 to 1:7, and general range is about 1:3 to 1:10, respectively.

The nonionic dispersant and wetting agent may be used at any level desired. The limiting factor is the amount of foam that can be tolerated in the particular media where the slimicide is used. A 7–10 mol ethylene oxide adduct of tridecyl alcohol is an example of a nonionic which may be used.

The concentration levels of propionic and/or benzoic acids are critical. The levels are preferably kept at about one percent, certainly no higher than 1.5%, in the case of the acetate complex in order to obtain the most effective results in corrosion inhibition. With the less acidic propionate complex, higher concentrations of propionic and/or benzoic acids, up to about four percent, are permissible.

The amount of isopropanol is preferably at least about 25% by weight of the formulation. The upper limit is determined largely by the flash point which can be tolerated.

In general, aliphatic substituted trimethylene diamines may have 5 to 20 carbons in the aliphatic N-substituted group. Additionally, amines of this type have one or more of the amino hydrogens replaced by a methyl group. Mixtures of diamine compounds may also be employed. Such mixtures are represented by those derived from naturally occurring fats and oils such as coconut oil, soy bean oil, tallow and the like. Examples of such mixtures are N-coco trimethylene diamine derived from coconut oil and in which "coco" comprises a mixture of aliphatic residues derived from coconut oil fatty acids; N-soya trimethylene diamine derived from soy bean oil and in which "soya" comprises a mixture of aliphatic groups derived from soy bean oil fatty acids; and N-tallow trimethylene diamine derived from tallow and in which "tallow" comprises a mixture of aliphatic radicals derived from the fatty acids of tallow.

Also applicable to the present invention as indicated above, are the polysubstituted N-aliphatic trimethylene diamines having at least one N-substituted (also referred to herein as amino substituted) methyl group, as for example, N-aliphatic-N-methyl trimethylene diamine, N-aliphatic-N'-methyl trimethylene diamine, N-aliphatic-N,N'-bis(methyl)-trimethylene diamine, N-aliphatic-N',N'-bis(methyl) trimethylene diamine, and N-aliphatic-N,N',N'-tris(methyl) trimethylene diamine.

The formulations in the following examples form stable aqueous solutions and provide satisfactory antibacterial and anti-fungal action. They are temperature stable to normal weather conditions and have virtually no corrosive action on steel drums.

EXAMPLE I

| | Percent by weight |
|---|---|
| Cupric propionate | 2.1 |
| Isopropanol | 30.0 |
| N-coco trimethylene diamine | 12.0 |
| Nonionic wetting-dispersing agent | 2.5 |
| Propionic acid | 2.9 |
| Tap water | 50.5 |

EXAMPLE II

| | |
|---|---|
| Cupric acetate (monohydrate) | 2.0 |
| Isopropanol | 30.0 |
| N-coco trimethylene diamine | 12.0 |
| Nonionic dispersing-wetting agent | 2.5 |
| Benzoic acid | 1.0 |
| Water | 52.5 |

EXAMPLE III

| | |
|---|---|
| Cupric acetate (monohydrate) | 2.0 |
| Isopropanol | 30.0 |
| N-coco trimethylene diamine | 12.0 |
| Nonionic dispersing-wetting agent | 2.5 |
| Propionic acid | 1.0 |
| Water | 52.5 |

The above formulations are prepared by dissolving the cupric salt in tap water. Solution thereof is facilitated by heating the water to about 130° F. When the solution of the cupric salt is complete the remaining ingredients are added with stirring in the order given. Any of the previously listed N-aliphatic trimethylene diamines may be substituted in the foregoing examples for N-coco trimethylene diamine to give equivalent slimicidal compositions.

Drum corrosion tests

The corrosion tests were run according to the following method: 180 ml. of the test solution was placed in a tall form 200 ml. beaker. A 1 in. by 2 in. sandblasted mild steel coupon was immersed in the solution, and another was suspended so that it was one-half immersed. The test was run for one week. At the end of this period the specimens were cleaned and reweighed, and the weight losses calculated. The tests were run at room temperature. A corrosion rate under 2.0 M. P. Y. is regarded as very slight corrosion. A corrosion rate under 0.2 M. P. Y. is regarded as no corrosion. The results of corrosion tests are shown in the following table:

TABLE I

| Composition | Corrosion Rate, Mils per Year | |
| --- | --- | --- |
|  | Submerged | Partially Submerged |
| Example I | 0.1 | 0.06 |
| Example II | 0.1 | 0.0 |
| Example III | 0.03 | 0.06 |

Stability tests

The products of Examples I to III were subjected for 14 days to temperatures alternating from room temperature during the day to 110° F. during the night. All three products remained as clear solutions. Samples of the same compositions were subjected to temperature variation cycles over a 14-day period by placing the samples in a freezer compartment held between 8°–10° F. overnight and bringing them to room temperature during the working day. All three products remained clear.

Plate killing test

The procedure employed is described in a paper by C. H. Bollenback and G. A. Cruickshank, 26 Analytical Chemistry 1355 (August 1954). The results obtained are reported in the following table:

TABLE II

A. aerogenes (1 hr. contact)

| Composition | Killing Range (p. p. m.) |
| --- | --- |
| Example I | 8-16 |
| Example II | 8-16 |
| Example III | 8-16 |

Gas tube killing and inhibiting tests

The gas tube method for making microbiological tests is carried out as follows. The culture medium used consists of 24 grams of dextrose, 1 gram of Basaminbact (Anheuser Busch), added to 1 liter of Chicago tap water and sterilized by autoclaving under 15 pounds of pressure for 15 minutes. An appropriate amount of an 18 to 24 hour nutrient broth culture of A. aerogenes is mixed with 200 ml. of the culture medium immediately before starting tests. The amount of culture is such as to give one million organisms per ml. of medium. 20 ml. of the inoculated culture medium is placed in each of a series of U. S. P. H. fermentation tubes with caps. Without touching the sides of the tubes a given amount of chemical to be tested is introduced using an appropriate concentration of stock chemical to avoid more than a 5% error in final dilution. For this purpose the volume of chemical introduced should be 1 ml. or less. The chemical and the inoculated medium are mixed gently. A control test is also run in which the chemical is omitted. In mixing, each tube is inverted in such a manner as to fill the upright closed end of the tube with the test liquid. The tubes are incubated at 30° C. for 24 hours. At the end of 1 hour contact and again after 24 hours contact a loopful of the test mixture is withdrawn from each tube and inoculated in a subculture tube containing 10 ml. of sterile nutrient broth. The subculture tubes are incubated at 37° C. for 48 hours and examined for growth. The results of these tests indicate 1 and 24 hour killing ranges. The gas production for inhibition level is recorded at 48 hours. The results obtained are reported in the following table:

TABLE III

Aspergillus niger

| Composition | Killing Range (p. p. m.) | | Inhibiting Range (p. p. m.) |
| --- | --- | --- | --- |
|  | 1 Hr. Contact | 24 Hr. Contact | 5-Day Reading |
| Example I | >200 | 50-100 | 50-100 |
| Example II | >200 | 50-100 | 50-100 |
| Example III | >200 | 50-100 | 50-100 |

Slime treatment

A slime dispersion test was run by continuously recirculating over eight pine boards sloping downwardly over a vat a culture medium of the composition: sodium chloride, 14 gms.; potassium nitrate, 14 gms.; magnesium sulfate, 14 gms.; 5% ferric citrate solution, 7 ml.; sodium dibasic phosphate, 100 gms.; dextrose, 140 gms.; degraded starch, 14 gms.; starch, 30 gms.; one 4" x 5" beelerized unprinted newsprint; 1% alcohol solution of 8-hydroxyquinoline, 1.4 ml.; and distilled water, q. s. 14 liters.

At the beginning, 100 p. p. m. of the composition of Example III was added to the system. After 17 hours of circulation of the culture medium over the boards, any starch or fiber accumulation was washed off the boards. The system was inoculated with A. aerogenes so that the system contained approximately $1 \times 10^6$ organisms per ml., and 100 p. p. m. of additional slimicide was added. At 24, 41, and 48 hours, 100 p. p. m. of additional slimicide was added—a total treatment of 500 p. p. m. After 65 hours, final observations were made. The culture medium temperature was kept constant at 35-37° C. Evaporation of the liquid was minimized by adding water to volume twice daily. The amount of slime accumulation on the boards, the type of accumulation on the boards (by microscopic examination), and the amount and type of deposit on the vat at the air-liquid interface were observed. Examination was also made of culture plates to determine changes in flora. The composition of Example III showed slime, good dispersion and good killing action.

The invention is hereby claimed as follows:

1. Compositions having slimicidal activity comprising an aqueous solution of a complex of a cupric salt of a lower molecular weight, saturated, monofunctional, fatty acid and an aliphatic N-substituted trimethylene diamine, the aliphatic group having 5 to 20 carbons, the ratio of cupric salt to diamine falling between 1:3 and 1:10 respectively.

2. The composition of claim 1 wherein the cupric salt is cupric acetate.

3. The composition of claim 1 wherein the cupric salt is cupric propionate.

4. Compositions having slimicidal activity comprising an aqueous solution of a complex of a cupric salt of a lower molecular weight, saturated, monofunctional, fatty acid and an aliphatic N-substituted trimethylene diamine, the aliphatic group having 5 to 20 carbons, the ratio of cupric salt to diamine being about 1:4 to 1:7 respectively.

5. Compositions having slimicidal activity comprising an aqueous solution of a complex of a cupric salt of a lower molecular weight, saturated, monofunctional, fatty acid and an aliphatic N-substituted trimethylene diamine, the aliphatic group having 5 to 20 carbons, the ratio of cupric salt to diamine falling between 1:3 and 1:10 respectively; at least about 25% isopropanol by weight of said solution, and a corrosion inhibitor selected from the group consisting of propionic acid and benzoic acid in sufficient quantity to inhibit the corrosion of mild carbon steel.

6. Compositions having slimicidal activity comprising an aqueous solution of a complex of a cupric salt of a lower molecular weight, saturated, monofunctional, fatty acid and an aliphatic N-substituted trimethylene diamine, the aliphatic group having 5 to 20 carbons, the ratio of cupric salt to diamine being about 1:4 to 1:7 respectively; at least about 25% isopropanol by weight of said solution, and a corrosion inhibitor selected from the group consisting of propionic acid and benzoic acid in sufficient quantity to inhibit the corrosion of mild carbon steel.

7. A process for killing and controlling growth of slime-forming microorganisms in an aqueous media which comprises contacting said slime-forming microorganisms with a water-soluble complex of a cupric salt of a lower molecular weight, saturated, monofunctional, fatty acid and an aliphatic N-substituted trimethylene diamine, the aliphatic group having 5 to 20 carbons, the ratio of cupric salt to diamine falling between 1:3 and 1:10 respectively.

8. The process of claim 7 wherein the cupric salt is cupric acetate.

9. The process of claim 7 wherein the cupric salt is cupric propionate.

10. A process for killing and controlling growth of slime-forming microorganisms in an aqueous media which comprises contacting said slime-forming microorganisms with a water-soluble complex of a cupric salt of a lower molecular weight, saturated, monofunctional, fatty acid and an aliphatic N-substituted trimethylene diamine, the aliphatic group having 5 to 20 carbons, the ratio of cupric salt to diamine being about 1:4 to 1:7 respectively.

References Cited in the file of this patent
UNITED STATES PATENTS

| | | |
|---|---|---|
| 1,968,341 | Hartmann | July 31, 1934 |
| 2,267,204 | Kyrides | Dec. 23, 1941 |

OTHER REFERENCES

Baker: Volatile Rust Inhibitors, 1954, p. 5.
Hackh: Chem. Dictionary, The Blakiston Co. (1944), p. 456.